Figure 1:
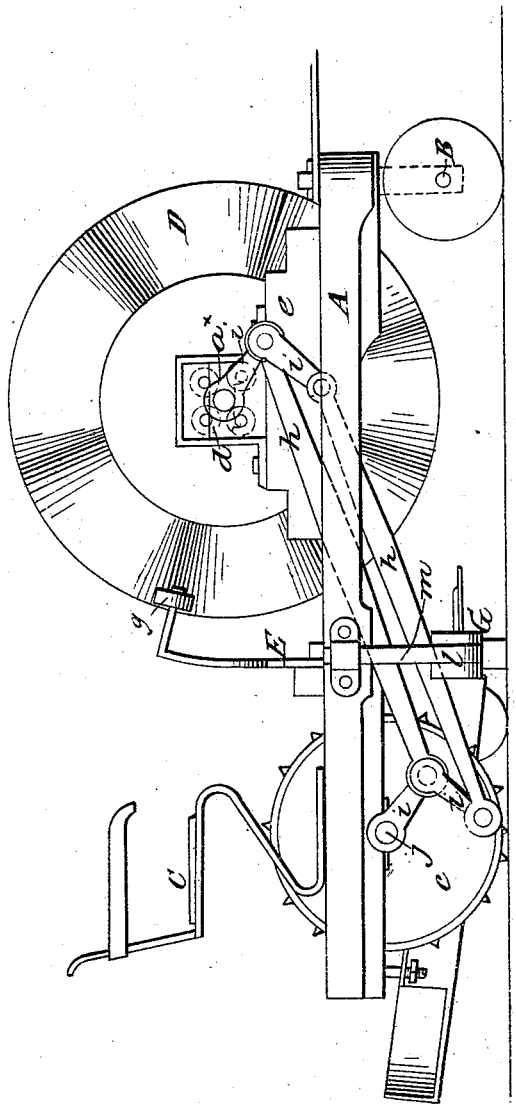

R. BRYSON.
Harvester.

No. 21,063.

2 Sheets—Sheet 1.

Patented Aug. 3, 1858.

R. BRYSON.
Harvester.
No. 21,063.
2 Sheets—Sheet 2.
Patented Aug. 3, 1858.
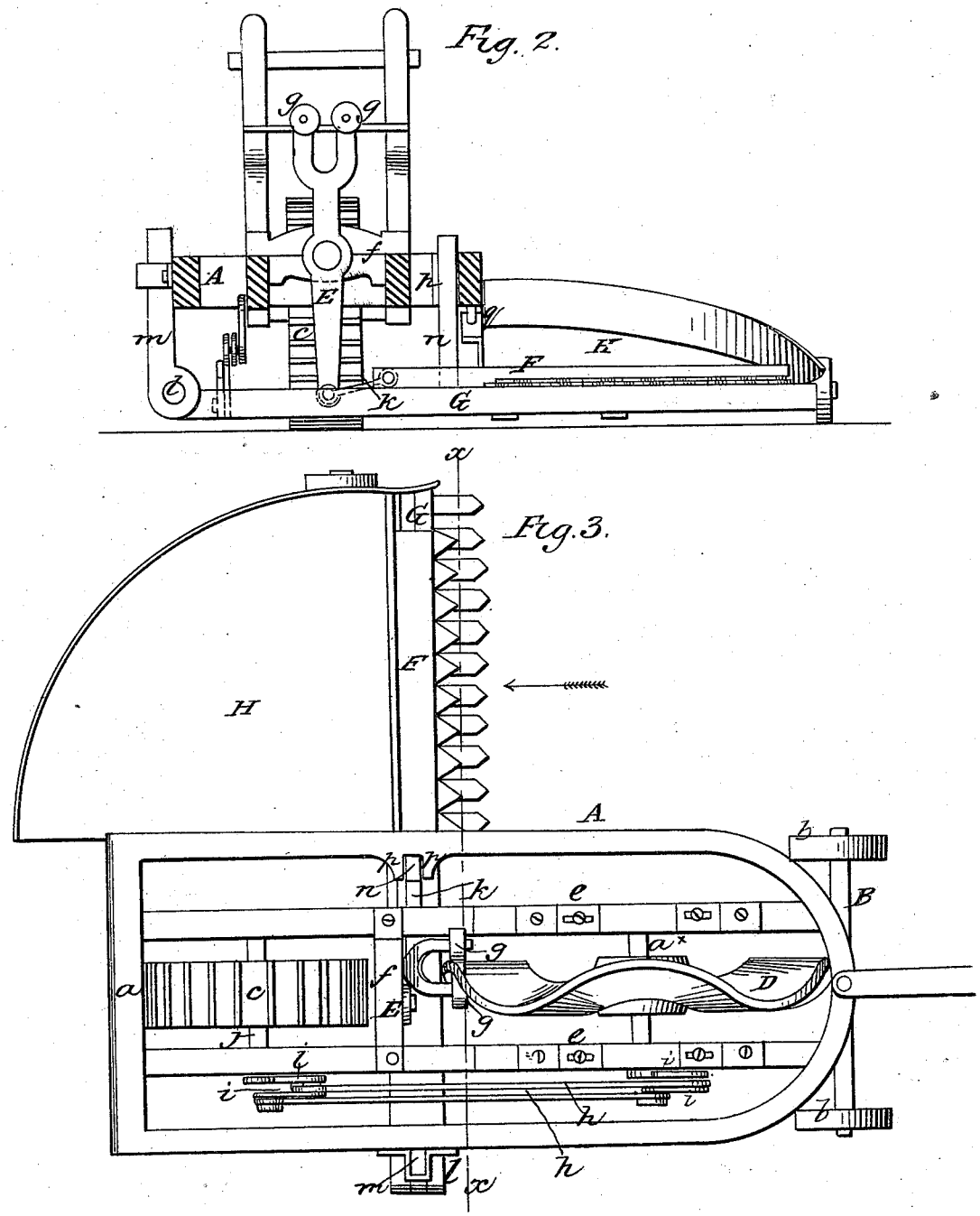

UNITED STATES PATENT OFFICE.

R. BRYSON, OF SCHENECTADY, NEW YORK.

IMPROVEMENT IN GRAIN AND GRASS HARVESTERS.

Specification forming part of Letters Patent No. 21,063, dated August 3, 1858.

*To all whom it may concern:*

Be it known that I, ROBERT BRYSON, of Schenectady, in the county of Schenectady and State of New York, have invented a new and useful Improvement in Grain and Grass Harvesters; and I do hereby declare that the following is a full, clear, and exact description of the same, reference being had to the annexed drawings, making a part of this specification, in which—

Figure 1 is a side elevation of a harvester constructed according to my invention. Fig. 2 is a vertical section of the same, taken in the line $xx$, Fig. 3. Fig. 3 is a plan or top view of the same.

Similar letters of reference indicate corresponding parts in the several figures.

This invention relates to an improved arrangement of parts for operating or driving the sickle, as hereinafter fully shown and described, whereby the proper speed is given the sickle from the driving-wheel by the employment of a very few parts working with but little friction, and capable of being so disposed as to favor, to a very considerable extent, lightness of draft, with a tendency to prevent or counteract what is known as "side draft."

To enable those skilled in the art to fully understand and construct my invention, I will proceed to describe it.

A represents the main frame of the machine, of oblong form, and constructed of two parallel beams connected by a transverse bar, $a$, at the back end, the front ends of the beams being rounded and connected to form a semicircular front, as shown clearly in Fig. 3. The front end of the main frame is supported by an axle, B, provided with a wheel, $b$, at each end and allowed to turn at its center, similar to the front wheels of the generality of four-wheeled vehicles. The back part of the main frame is supported by a wheel, $c$, and the driver's seat C is attached to the main frame, said seat being over the wheel $c$.

In the front part of the main frame A a cam, D, is placed. This cam is a wheel having a zigzag periphery or edge forming a sinuous annular plate. (See Figs. 1 and 3.) The axle $a^\times$ of the cam D is fitted in bearings formed of friction-rollers $d$, which are placed in suitable boxes attached to longitudinal bars $ee$ in the main frame. The cam D is placed in line with the driving-wheel $c$, and but a short distance in front of it.

E is a vertical bar, which is pivoted to a traverse bar, $f$, in the main frame A. The upper end of the bar E is bifurcated, and each prong is provided with a friction-roller, $g$. The edge of the cam D is fitted and works between the prongs of the bar E, as shown clearly in Fig. 3. The cam D is driven from the wheel $c$ by means of two connecting-rods, $hh$, which are attached to double cranks $ii$, connected to the axle $j$ of the wheel $c$ and to axle $a^\times$ of the cam D, the cranks $ii$ of each axle being placed at right angles with each other, as shown clearly in Fig. 1. The cam D, it will seen, is driven from the right or outer side of the wheel $c$.

The lower end of the bar E is pivoted to a link, $k$, which is attached to the sickle-bar F. The cutting device may be of any of the known reciprocating kinds; and the finger or lower stationary bar, G, is connected by a joint, $l$, with a pendant, $m$, of frame A. The bar G has an upright, $n$, attached to it, and this upright passes through a slot in the sickle-bar F, and works between guides $p$ in the main frame A. The upright $n$, it will seen, serves as a guide to the sickle-bar F and bar G.

To the bar G the platform H is attached. This platform is of quadrant form, and is supported or guided at its inner side, near its back end, by a rod, $q$, (see Fig. 2,) in which the platform is allowed to work freely up and down.

The operation is as follows: As the machine is drawn along, the rods $hh$ and cranks $i$ communicate a rotary motion to the cam D from the wheel $c$, and the cam D vibrates the bar E, which communicates a reciprocating motion to the sickle-bar F. By this arrangement of parts it will be seen that a large cam may be used and a quick movement of the sickle obtained with a medium-sized driving-wheel. The working parts are also allowed to be placed in line with the draft-pole, and the crank-and-rod connection, which communicates motion to cam D from the driving-wheel $c$, may be placed at the right side of the cam and wheel, thereby serving to counteract, to a certain extent, the side draft or resistance offered to the sickle by the grass or grain, the sickle being at the opposite side of the driving-wheel and cam By employing the double cranks $i$ one assist the other past its center and nearly equalizes the motion.

I am aware that cams similar to D have been previously used, and I also am aware that the double-crank connection is an old and well-known device. I do not claim, therefore, any of the parts separately or in the abstract, irrespective of the arrangement as herein shown and described; but

What I claim as new, and desire to secure by Letters Patent, is—

Placing the cam D in front of the driving-wheel c, and operating it therefrom by means of the double crank i and the rods h h, when these several parts are constructed and arranged relatively with respect to each other and to the bar E in the manner and for the purpose set forth.

ROBERT BRYSON.

Witnesses:
ELIPHT. NOTT,
E. N. POTTER.